(12) United States Patent
Takahashi

(10) Patent No.: US 10,936,103 B2
(45) Date of Patent: Mar. 2, 2021

(54) TOUCH PANEL-EQUIPPED DISPLAY DEVICE

(71) Applicant: STANLEY ELECTRIC CO., LTD., Tokyo (JP)

(72) Inventor: Kazuya Takahashi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/719,714

(22) Filed: Dec. 18, 2019

(65) Prior Publication Data

US 2020/0201467 A1    Jun. 25, 2020

(30) Foreign Application Priority Data

Dec. 25, 2018  (JP) .............................. JP2018-241193

(51) Int. Cl.
*G06F 3/041* (2006.01)
*G06F 3/01* (2006.01)

(52) U.S. Cl.
CPC ............ *G06F 3/0412* (2013.01); *G06F 3/016* (2013.01)

(58) Field of Classification Search
CPC .................... G06F 3/0412; G06F 3/016; G06F 2203/04103
See application file for complete search history.

(56) References Cited

U.S. PATENT DOCUMENTS

| 2018/0166772 A1* | 6/2018 | Wei ........................ H01Q 1/2266 |
| 2019/0116406 A1* | 4/2019 | Ahn ........................ H04M 1/03 |
| 2020/0125174 A1* | 4/2020 | Oikawa ................... G06F 3/041 |

FOREIGN PATENT DOCUMENTS

| JP | 2008-287402 A | 11/2008 | |
| JP | 2008287402 A | * 11/2008 | ............. G06F 3/016 |

* cited by examiner

*Primary Examiner* — Robert J Michaud
(74) *Attorney, Agent, or Firm* — Kenealy Vaidya LLP

(57) ABSTRACT

A touch panel-equipped display device includes a front-side case that accommodates a display panel and a touch panel overlap each other, a support plate fixed at a side opposite with respect to a display surface of the front-side case, a back-side case disposed at a side opposite of the display panel with respect to the support plate, a vibration element fixed between the back-side case and the support plate and that vibrates the front-side case and the support plate in an in-plane direction of the display panel according to an operation on the touch panel, and a damper mechanism that supports the front-side case or the support plate so that the front-side case or the support plate is capable of being freely vibrated in the in-plane direction of the touch panel, wherein the damper mechanism has an elastic displacement section elastically displaced in the in-plane direction of the back-side case.

8 Claims, 5 Drawing Sheets

TOUCH PANEL-EQUIPPED DISPLAY DEVICE

CROSS-REFERENCE TO RELATED APPLICATION

Priority is claimed on Japanese Patent Application No. 2018-241193, filed Dec. 25, 2018, the content of which is incorporated herein by reference.

BACKGROUND

Field of the Invention

The present invention relates to a touch panel-equipped display device.

Description of Related Art

In the related art, there is a touch panel-equipped display device including a display panel and a touch panel, and capable of enabling various inputs by the touch panel being operated according to an image displayed on the display panel (for example, see Japanese Unexamined Patent Application, First Publication No. 2008-287402). In addition, among the touch panel-equipped display device in the related art, devices that include a vibration element configured to generate vibrations (according to a sense of touch) according to operations of the touch panel are known.

SUMMARY OF THE INVENTION

Incidentally, in the above-mentioned touch panel-equipped display device, there are restrictions on the disposition of a vibration element, and vibrations from the vibration element may not be able to be transmitted efficiently, resulting in vibration non-uniformity.

In addition, a touch panel-equipped display device in the related art includes a front-side case configured to accommodate a display panel and a touch panel, and a back-side case integrally combined with the front-side case. In such touch panel-equipped display device, vibration transmitted from the front-side case to which the vibration element is attached to the back-side case to which a control board or the like is attached is suppressed due to a plurality of rubber bushes being disposed between the front-side case and the back-side case.

However, when such rubber bushes are used, the hardness (elasticity) of a rubber bush changes with respect to temperature change. For this reason, differences may occur in vibrations transmitted from the vibration element, vibrations from the vibration element may not be able to be efficiently transmitted, or the control board or the like may be adversely influenced by vibrations transmitted from the front-side case to the back-side case.

An aspect of the present invention provides a touch panel-equipped display device capable of efficiently transmitting vibration from a vibration element according to an operation of a touch panel and suppressing vibration transmitted from a front-side case to a back-side case.

In order to accomplish the above-mentioned purposes, the present invention provides the following means.

[1] A touch panel-equipped display device including:

a front-side case configured to accommodate a display panel and a touch panel in a state in which the display panel and the touch panel overlap each other;

a support plate fixed at a side opposite with respect to a display surface of the front-side case;

a back-side case disposed at a side opposite of the display panel with respect to the support plate;

a vibration element that is fixed between the back-side case and the support plate and that is configured to relatively vibrate the front-side case and the support plate with respect to the back-side case in an in-plane direction of the display panel according to an operation on the touch panel; and a damper mechanism configured to support the front-side case or the support plate so that the front-side case or the support plate is capable of being freely vibrated with respect to the back-side case in an in-plane direction of the touch panel, wherein the damper mechanism has an elastic displacement section that is provided on the back-side case and that is configured to be elastically displaced in an in-plane direction of the back-side case.

[2] The touch panel-equipped display device according to the above-mentioned [1], wherein the damper mechanism has a first fixed section fixed to the support plate, and a second fixed section fixed to the elastic displacement section.

[3] The touch panel-equipped display device according to the above-mentioned [2], wherein the elastic displacement section has a fixed piece on which the second fixed section is provided, and a pair of elastic pieces respectively extending in opposite directions from both sides while having the fixed piece interposed therebetween, and the elastic displacement section is provided while being suspended inside an opening section formed in the back-side case.

[4] The touch panel-equipped display device according to the above-mentioned [3], wherein the fixed piece has a flat plate shape parallel to the in-plane direction of the back-side case, and the pair of elastic pieces have a flat plate shape perpendicular to the in-plane direction of the back-side case.

[5] The touch panel-equipped display device according to any one of the above-mentioned [2] to [4], wherein the elastic displacement section is formed integrally with the back-side case.

[6] The touch panel-equipped display device according to any one of the above-mentioned [2] to [5], wherein the first fixed section and the second fixed section are integrally fixed to each other by a fixing tool.

[7] The touch panel-equipped display device according to any one of the above-mentioned [1] to [6], wherein a cushioning material interposed between the support plate and the back-side case is provided.

[8] The touch panel-equipped display device according to any one of the above-mentioned [1] to [7], wherein a circuit board that is attached to the back-side case and that is electrically connected to the vibration element via a cable is provided.

As described above, according to the aspect of the present invention, it is possible to provide a touch panel-equipped display device capable of efficiently transmitting vibrations from a vibration element according to an operation on a touch panel and suppressing vibration transmitted from a front-side case to a back-side case.

DESCRIPTION OF EMBODIMENTS

Figure 1:
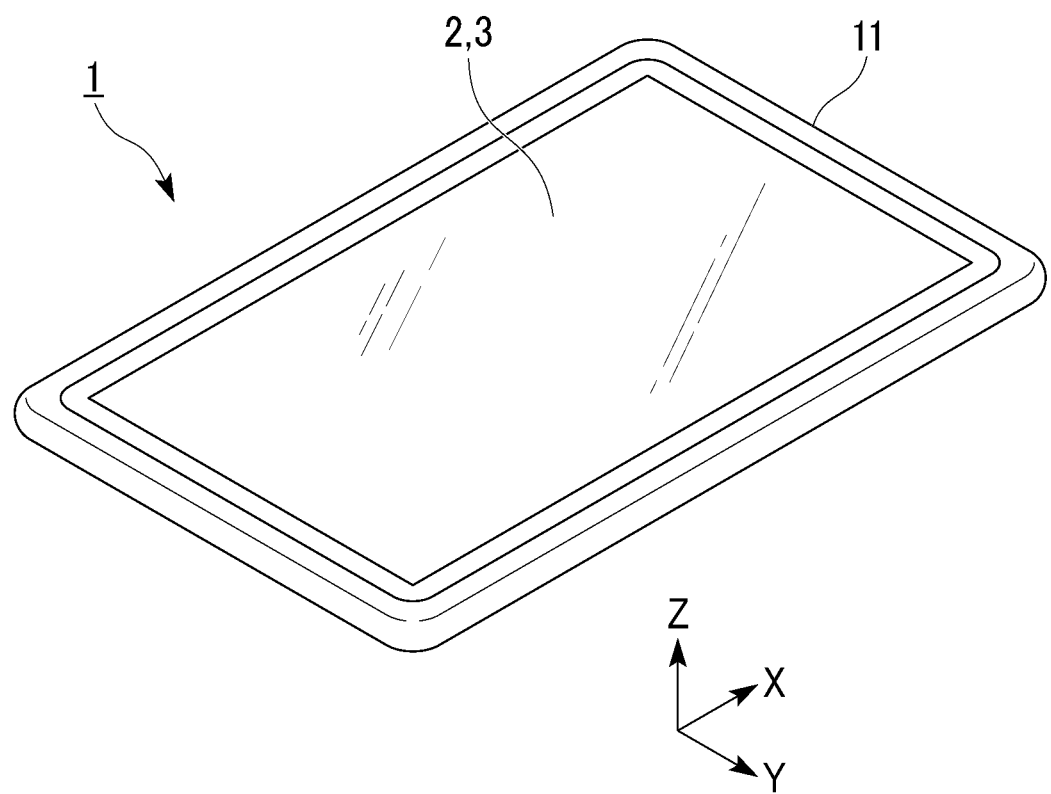
FIG. 1 is a perspective view showing an appearance of a touch panel-equipped display device according to an embodiment of the present invention.

Hereinafter, an embodiment of the present invention will be described in detail with reference to the accompanying drawings.

Further, in the drawings used in the following description, in order to make components easier to see, dimensional scales may be different depending on the components, and dimensional ratios or the like in each component may not always be the same as actual ones.

As an embodiment of the present invention, for example, a touch panel-equipped display device 1 shown in FIG. 1 to FIG. 4 will be described.

Figure 2:
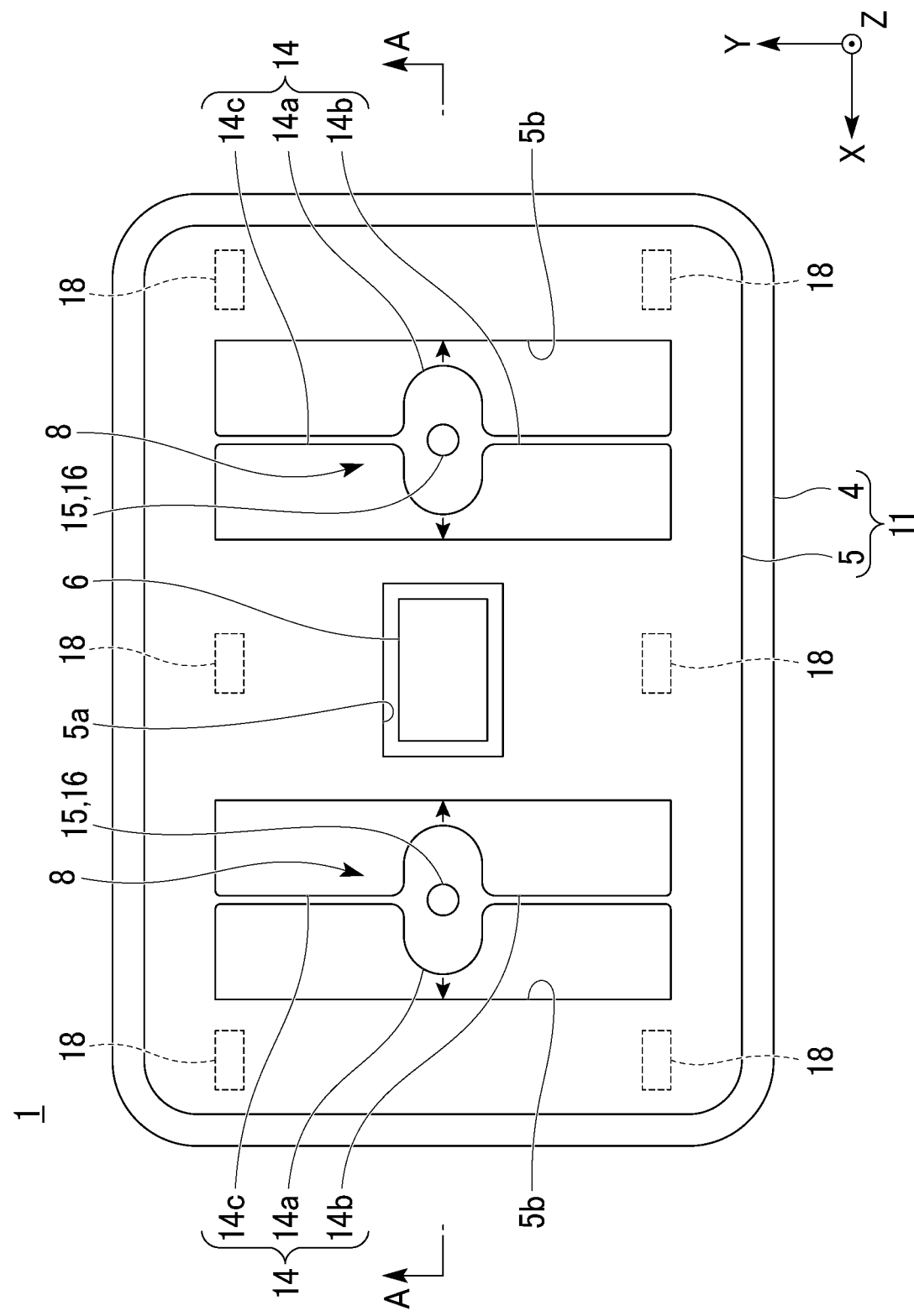
FIG. 2 is a transparent plan view showing a configuration of the touch panel-equipped display device shown in FIG. 1.
Figure 3:
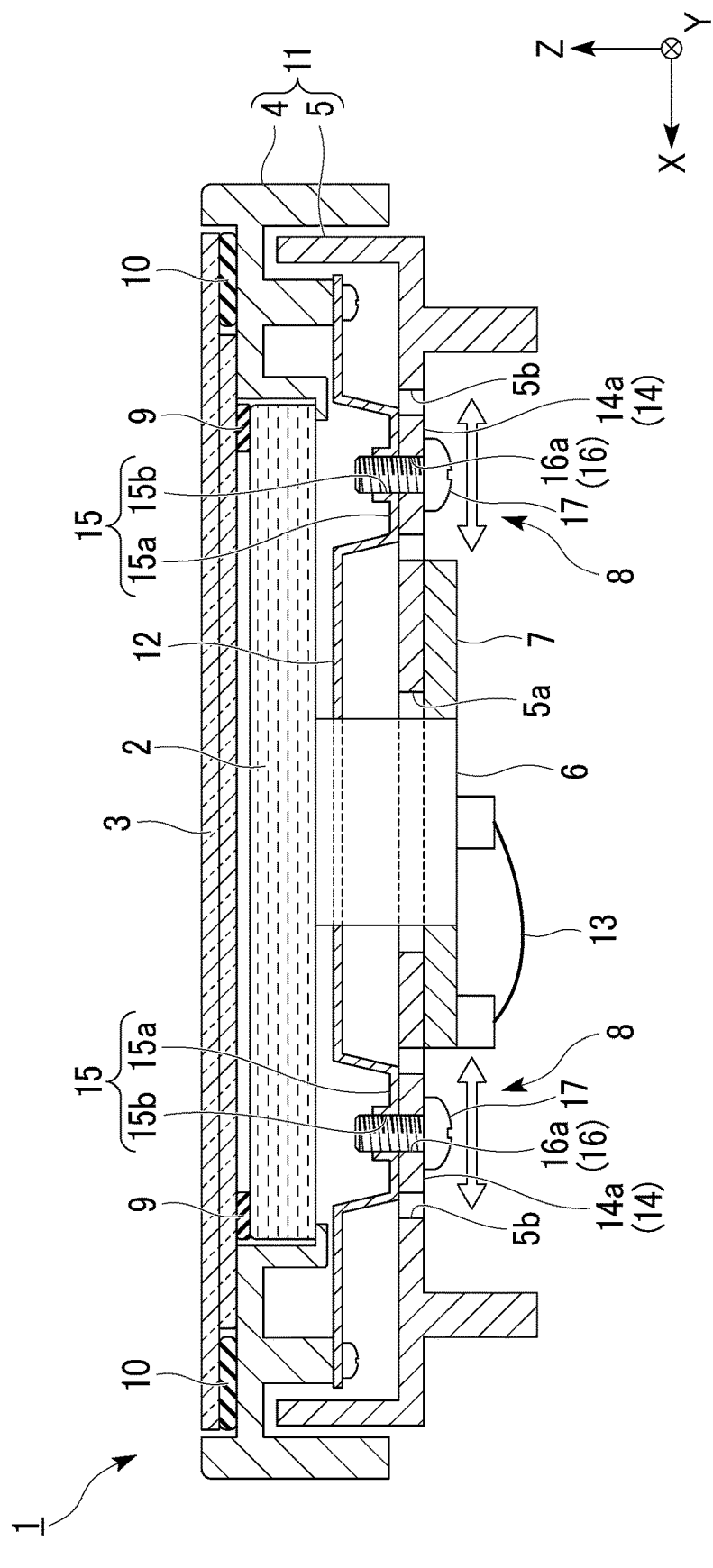
FIG. 3 is a cross-sectional view of the touch panel-equipped display device taken along line segment A-A shown in FIG. 2.
Figure 4:
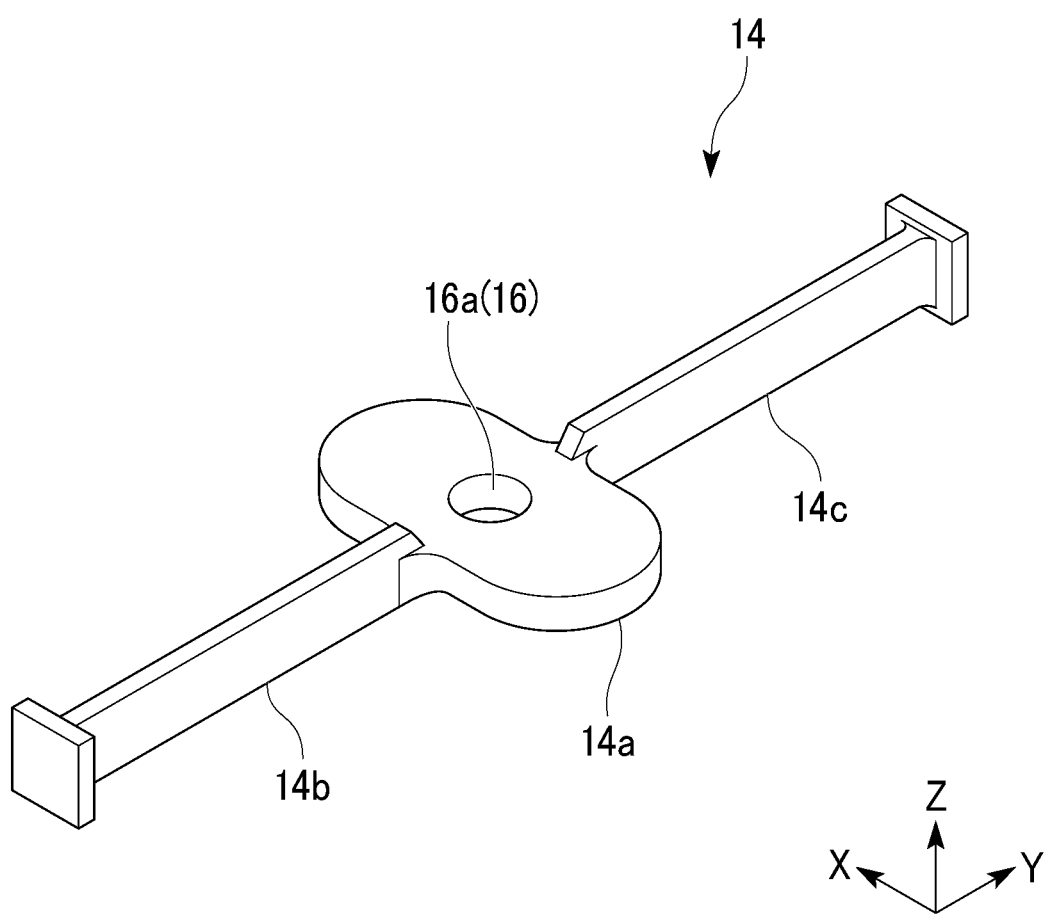
FIG. 4 is a perspective view showing a configuration of an elastic displacement section provided in the touch panel-equipped display device shown in FIG. 1.

Further, FIG. 1 is a perspective view showing an appearance of the touch panel-equipped display device 1. FIG. 2 is a transparent plan view showing a configuration of the touch panel-equipped display device 1. FIG. 3 is a cross-sectional view of the touch panel-equipped display device 1 taken along line segment A-A shown in FIG. 2. FIG. 4 is a perspective view showing a configuration of an elastic displacement section 14 provided in the touch panel-equipped display device 1.

In addition, in the drawings described below, an XYZ orthogonal coordinate system is set, an X-axis direction indicates a longitudinal direction (a lengthwise direction) in a horizontal surface of the touch panel-equipped display device 1, a Y-axis direction indicates a short-length direction (a widthwise direction) in the horizontal surface of the touch panel-equipped display device 1, and a Z-axis direction indicates a vertical direction (a height direction) perpendicular to the horizontal surface of the touch panel-equipped display device 1.

As shown in FIG. 1, FIG. 2 and FIG. 3, the touch panel-equipped display device 1 of the embodiment includes a display panel 2, a touch panel 3, a front-side case 4, a back-side case 5, a vibration element 6, a control board 7 and a damper mechanism 8.

The display panel 2 is configured to display images. In the embodiment, for example, a liquid crystal display panel (LCD) is used as the display panel 2. Further, in addition to the above-mentioned liquid crystal display panel, for example, an organic electroluminescence (EL) display panel (OLED) or the like may be used as the display panel 2. The display panel 2 has a substantially rectangular flat plate shape as a whole, and is attached by a hook structure, a fastening screw, or the like, on a side of a front surface of the front-side case 4.

Further, in the touch panel-equipped display device 1 shown in FIG. 1, an image displayed on the display panel 2 can be recognized from a side of the positive Z axis. That is, the touch panel-equipped display device 1 includes a display surface on the side of the positive Z axis.

The touch panel 3 performs various inputs using operations on a screen according to the image displayed on the display panel 2. In the embodiment, for example, a capacitance touch panel (CTP) is used as the touch panel 3. Further, in addition to the above-mentioned capacitance, for example, another type such as a resistive membrane type or the like may be used as the touch panel 3.

The touch panel 3 has a substantially rectangular flat plate shape as a whole and a larger external form than that of the display panel 2. The touch panel 3 is attached to the front-side case 4 on the side of the front surface via an adhesive material 10 such as a double sided tape or the like while being superimposed on the display panel 2 via a cushion material 9 on the side of the display surface.

The front-side case 4 constitutes a main body case 11 together with the back-side case 5, and is formed of a resin molded material such as a plastic or the like. The front-side case 4 is formed in a substantially rectangular frame shape as a whole to accommodate the display panel 2 and the touch panel 3 that overlap each other.

The back-side case 5 constitutes the main body case 11 together with the front-side case 4, and is formed of a resin molded material such as plastic or the like. The back-side case 5 is formed in a substantially rectangular box shape as a whole and is integrally combined with the front-side case 4. In addition, the back-side case 5 has an external form smaller than that of the front-side case 4, and can be fitted into the inner side of the front-side case 4 from the side of the back surface of the front-side case 4.

Further, while, for example, an ABS resin or a mixed resin material of an ABS resin and a PC resin is used in the front-side case 4 and the back-side case 5 in the embodiment, the embodiment is not particularly limited to these materials.

The vibration element 6 is configured to vibrate the front-side case 4 according to an operation on the touch panel 3, and is constituted by, for example, a linear vibrator (LRA), a voice coil motor (VCM), a piezo (piezoelectric) element, an eccentric motor (ERM), or the like.

The vibration element 6 is attached to a side of the front-side case 4 opposite to the display surface, i.e., a side of the back surface of the front-side case 4 via a support plate 12. The support plate 12 is formed of a metal such as stainless steel (SUS), aluminum, a nickel alloy, or the like, a resin, or the like, and formed in a substantially rectangular flat plate shape as a whole to cover the side of the back surface of the front-side case 4.

The support plate 12 is attached to the side of the back surface of the front-side case 4 by fastening screws or the like. The back-side case 5 is disposed on a side which is opposite to the display panel 2 with respect to the support plate 12. The vibration element 6 is attached at the vicinity of a center of the side of the back surface of the support plate 12 (a position overlapping substantially a central section of the display panel 2 when seen in a plan view). In addition, an opening section 5a that surrounds the surroundings of the vibration element 6, which is attached to the support plate 12, is provided at a substantially central section of the back-side case 5. In the embodiment, the vibration element 6 vibrates in a longitudinal direction of the touch panel-equipped display device 1.

The control board 7 is constituted by a circuit board on which a driving circuit or the like configured to control driving of the vibration element 6 is provided. The control board 7 is attached to the back-side case 5 by a fastening screw or the like. In addition, the control board 7 is electrically connected to the vibration element 6 via a cable 13.

The damper mechanism 8 is interposed between the front-side case 4 and the back-side case 5, and supports the front-side case 4 with respect to the back-side case 5 to be freely vibrated in an in-plane direction of the touch panel 3. In the embodiment, in the horizontal surface of the touch panel-equipped display device 1, two damper mechanisms 8 are provided on both sides of the touch panel-equipped display device 1 in the longitudinal direction with the vibration element 6 sandwiched therebetween.

Specifically, as shown in FIG. 2, FIG. 3 and FIG. 4, the damper mechanism 8 has the elastic displacement section 14 provided on the back-side case 5, a first fixed section 15 fixed to the support plate 12, and a second fixed section 16 fixed to the elastic displacement section 14.

The elastic displacement section 14 has a fixed piece 14a on which the second fixed section 16 is provided, and a pair of elastic pieces 14b and 14c extending in opposite directions (in the embodiment, a short-length direction of the touch panel-equipped display device 1) from both sides with the fixed piece 14a sandwiched therebetween.

The fixed piece 14a has a flat plate shape parallel to the in-plane direction of the back-side case 5. The fixed piece 14a of the embodiment has a disk shape or an oval disk shape in a longitudinal direction of the touch panel-equipped display device 1. The pair of elastic pieces 14b and 14c have a flat plate shape perpendicular to the in-plane direction of the back-side case 5. The elastic pieces 14b and 14c of the embodiment have an elongated plate shape extending in the short-length direction of the touch panel-equipped display device 1. That is, the pair of elastic pieces 14b and 14c have a flat plate shape perpendicular to the longitudinal direction of the touch panel-equipped display device 1 that is a vibration direction of the vibration element 6.

The elastic displacement section 14 is provided while being suspended inside an opening section 5b formed in the back-side case 5. That is, the elastic displacement section 14 is formed integrally with the back-side case 5. The opening section 5b is opened in a rectangular shape so as to surround the surroundings of the elastic displacement section 14. The elastic displacement section 14 is provided while being suspended inside the opening section 5b by having one of the end sides of the elastic pieces 14b and 14c connected to the fixed piece 14a and having the other one of the end sides of the elastic pieces 14b and 14c connected to the back-side case 5 in which the opening section 5b is formed.

Accordingly, in the elastic displacement section 14, by using the bending deformation of the pair of elastic pieces 14b and 14c, the fixed piece 14a, which is connected to the pair of elastic pieces 14b and 14c, can be elastically displaced in the in-plane direction of the back-side case 5 (in the embodiment, the longitudinal direction of the touch panel-equipped display device 1).

In addition, in the touch panel-equipped display device 1 of the embodiment, manufacturing costs of the touch panel-equipped display device 1 can be reduced by integrally forming the elastic displacement section 14 with the back-side case 5.

Further, the elastic displacement section 14 is not particularly limited to being integrally formed with the back-side case 5, and the elastic displacement section 14 separately formed from the back-side case 5 may be provided while being suspended inside the opening section 5b of the back-side case 5. In this case, the elastic displacement section 14 may be formed of a material different from the back-side case 5.

The first fixed section 15 has a pedestal section 15a protruding from a position of the support plate 12, which is opposite to the fixed piece 14a, toward the back-side case 5, and a screw hole 15b formed in the pedestal section 15a. Meanwhile, the second fixed section 16 has a through-hole 16a passing through the fixed piece 14a. In the damper mechanism 8, the first fixed section 15 and the second fixed section 16 are integrally fixed by threadedly engaging a screw 17 that is a fixing tool with the screw hole 15b through the through-hole 16a.

In addition, the touch panel-equipped display device 1 of the embodiment includes at least one or a plurality of (in the embodiment, six) pieces of cushioning material 18 interposed between the support plate 12 and the back-side case 5. The cushioning material 18 may be appropriately selected and used from materials that can absorb vibrations, like the above-mentioned cushion material 9 or the like. The cushioning material 18 is appropriately disposed in a range in which the support plate 12 and the back-side case 5 overlap each other while being sandwiched between the support plate 12 and the back-side case 5. Accordingly, vibrations transmitted from the support plate 12 to the back-side case 5 can be minimized, or resonance can be prevented.

In the touch panel-equipped display device 1 of the embodiment having the above-mentioned configuration, the front-side case 4 can be supported by the back-side case 5 to be freely vibrated in the in-plane direction of the touch panel 3 (in the embodiment, the longitudinal direction of the touch panel-equipped display device 1) by the damper mechanism 8 interposed between the support plate 12 and the back-side case 5.

Accordingly, vibration transmitted from the front-side case 4, which is a movable side to which the vibration element 6 is attached, to the back-side case 5, which is a fixed side to which the control board 7 is attached, can be minimized. In addition, it is possible to prevent the control board 7 and the like from being adversely affected by vibration transmitted from the vibration element 6.

In addition, in the touch panel-equipped display device 1 of the embodiment, vibrations from the vibration element 6 can be efficiently and uniformly transmitted to the front-side case 4 by vibrating the front-side case 4 with respect to the back-side case 5 in the in-plane direction of the touch panel 3. Accordingly, it is also possible to use the vibration element 6 that is smaller than that in the related art.

As described above, in the touch panel-equipped display device 1 of the embodiment, vibrations from the vibration element 6 can be efficiently transmitted according to an operation on the touch panel 3, and further, vibrations transmitted from the front-side case 4 to the back-side case 5 can be minimized Further, the present invention is not particularly limited to the embodiment, and various modifications may be made without departing from the scope of the present invention.

For example, in the touch panel-equipped display device 1, while the configuration in which the two damper mechanisms 8 are disposed has been exemplified, at least one or a plurality of damper mechanisms 8 may be disposed.

Figure 5A:
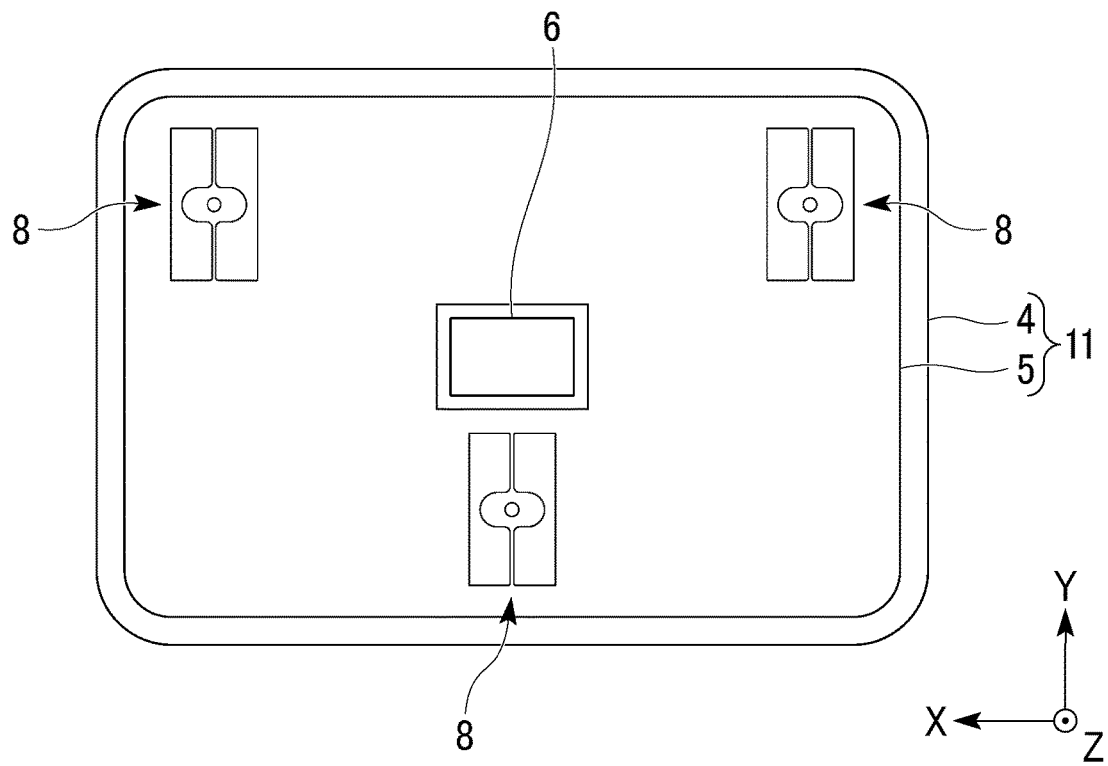
FIG. 5A is a transparent plan view exemplarily showing a disposition of the elastic displacement section in the touch panel-equipped display device shown in FIG. 1.

For example, in the touch panel-equipped display device 1, a configuration in which three damper mechanisms 8 are disposed is shown in FIG. 5A. In the configuration shown in FIG. 5A, in a horizontal surface of the touch panel-equipped display device 1, the three damper mechanisms 8 are disposed to be located on each of the apexes of a triangular shape that surround a vibration element 6 disposed in the vicinity of a center thereof.

Figure 5B:
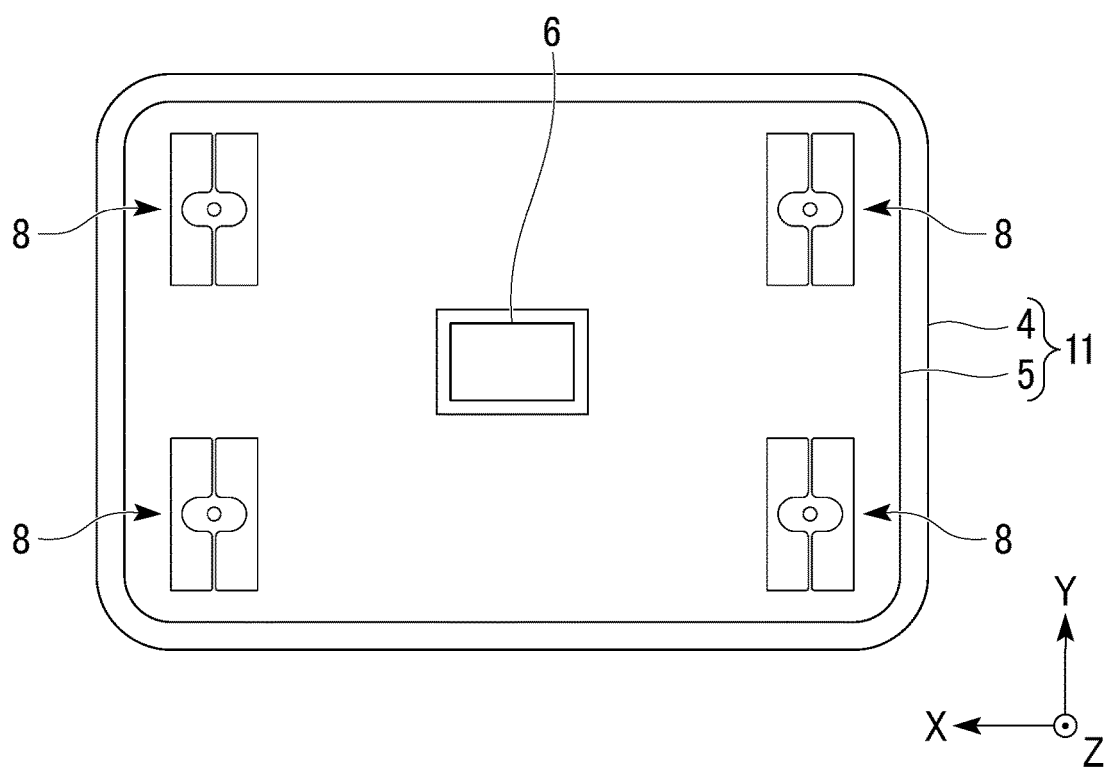
FIG. 5B is a transparent plan view exemplarily showing a disposition of the elastic displacement section in the touch panel-equipped display device shown in FIG. 1.

Meanwhile, in the touch panel-equipped display device 1, a configuration in which four the damper mechanisms 8 are disposed is shown in FIG. 5B. In the configuration shown in FIG. 5B, in a horizontal surface of the touch panel-equipped display device 1, four damper mechanisms 8 are disposed to be located at each of the apexes of a quadrangular shape that surround the surroundings of the vibration element 6 disposed in the vicinity of a center thereof.

Further, uses of the touch panel-equipped display device 1 are not particularly limited, and for example, the touch panel-equipped display device 1 can be widely used in applications that are applicable to a touch operation panel of an OA instrument such as a copier (a multifunction machine), a printer, or the like, an on-vehicle touch operation panel, or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A touch panel-equipped display device comprising:
   a front-side case configured to accommodate a display panel and a touch panel in a state in which the display panel and the touch panel overlap each other;
   a support plate fixed at a side opposite with respect to a display surface of the front-side case;
   a back-side case disposed at a side opposite of the display panel with respect to the support plate;
   a vibration element that is fixed between the back-side case and the support plate and that is configured to relatively vibrate the front-side case and the support plate with respect to the back-side case in an in-plane direction of the display panel according to an operation on the touch panel; and
   a damper mechanism configured to support the front-side case or the support plate so that the front-side case or the support plate is capable of being freely vibrated with respect to the back-side case in an in-plane direction of the touch panel,
   wherein the damper mechanism has an elastic displacement section that is arranged inside of an opening which is formed in a surface of the back-side case and that is configured to be elastically displaced in an in-plane direction of the surface of the back-side case.

2. The touch panel-equipped display device according to claim 1, wherein the damper mechanism has a first fixed section fixed to the support plate, and a second fixed section fixed to the elastic displacement section.

3. The touch panel-equipped display device according to claim 2, wherein the elastic displacement section has a fixed piece on which the second fixed section is provided, and a pair of elastic pieces respectively extending in opposite directions from both sides while having the fixed piece interposed therebetween, and the elastic displacement section is provided while being suspended inside the opening formed in the surface of the back-side case.

4. The touch panel-equipped display device according to claim 3, wherein the fixed piece has a flat plate shape parallel to the in-plane direction of the surface of the back-side case, and
   the pair of elastic pieces have a flat plate shape perpendicular to the in-plane direction of the surface of the back-side case.

5. The touch panel-equipped display device according to claim 2, wherein the elastic displacement section is formed integrally with the surface of the back-side case.

6. The touch panel-equipped display device according to claim 2, wherein the first fixed section and the second fixed section are integrally fixed to each other by a fixing tool.

7. The touch panel-equipped display device according to claim 1, wherein a cushioning material interposed between the support plate and the back-side case is provided.

8. The touch panel-equipped display device according to claim 1, wherein a circuit board that is attached to the back-side case and that is electrically connected to the vibration element via a cable is provided.

* * * * *